March 8, 1949. N. A. SCHASSBERGER 2,463,646
VEHICLE TOP CONSTRUCTION
Filed July 13, 1945 3 Sheets-Sheet 1
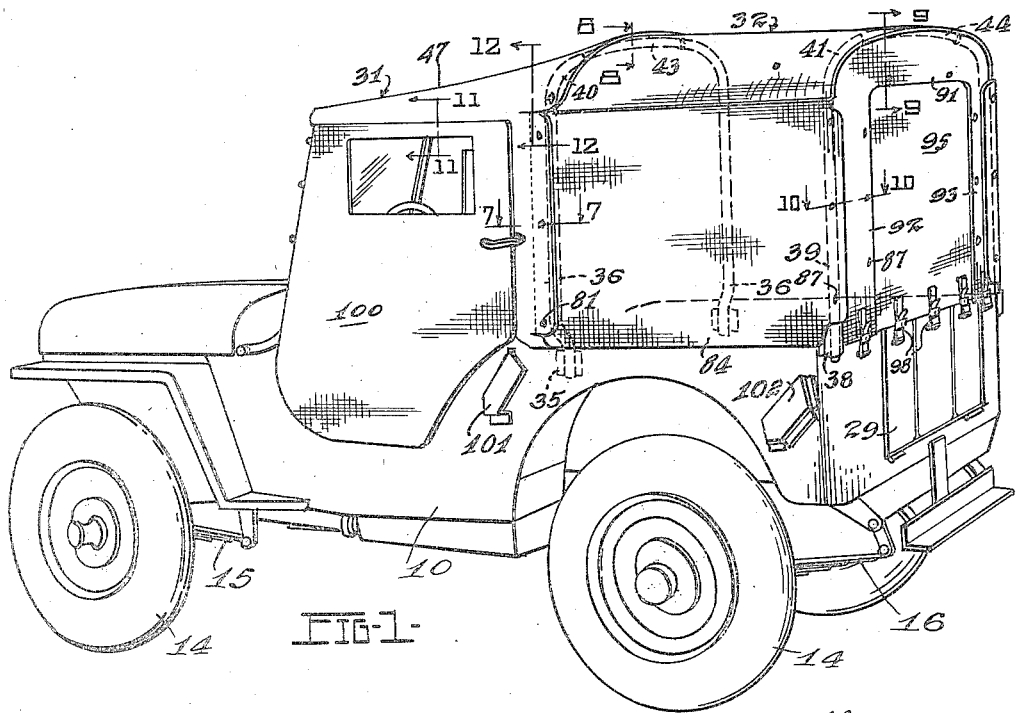
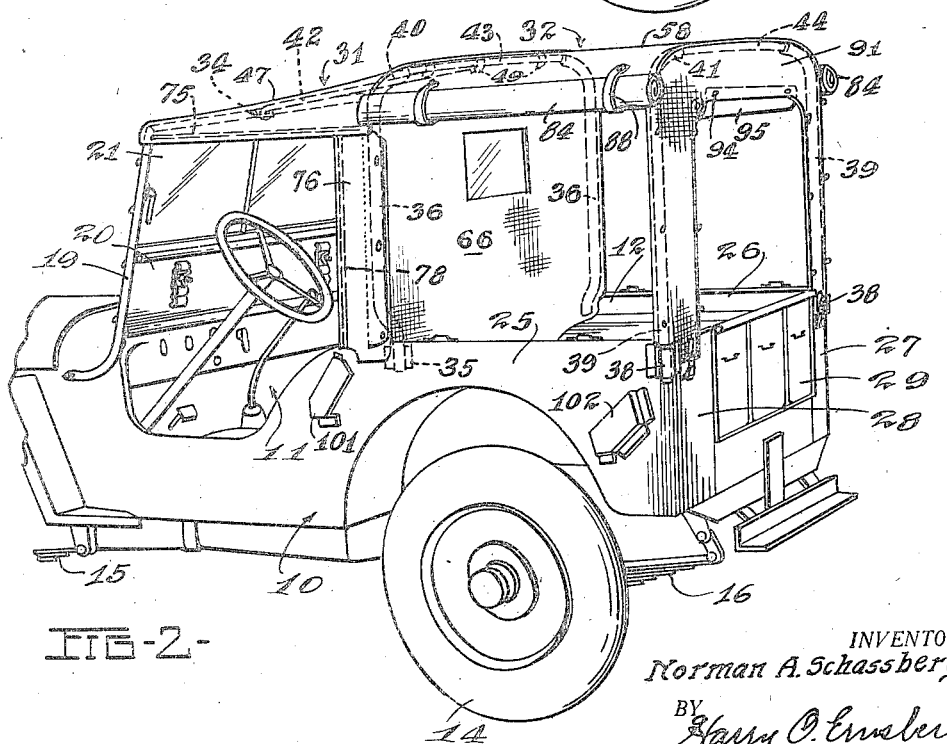
INVENTOR.
Norman A. Schassberger
BY Harry O. Ernsberger
ATTORNEY.

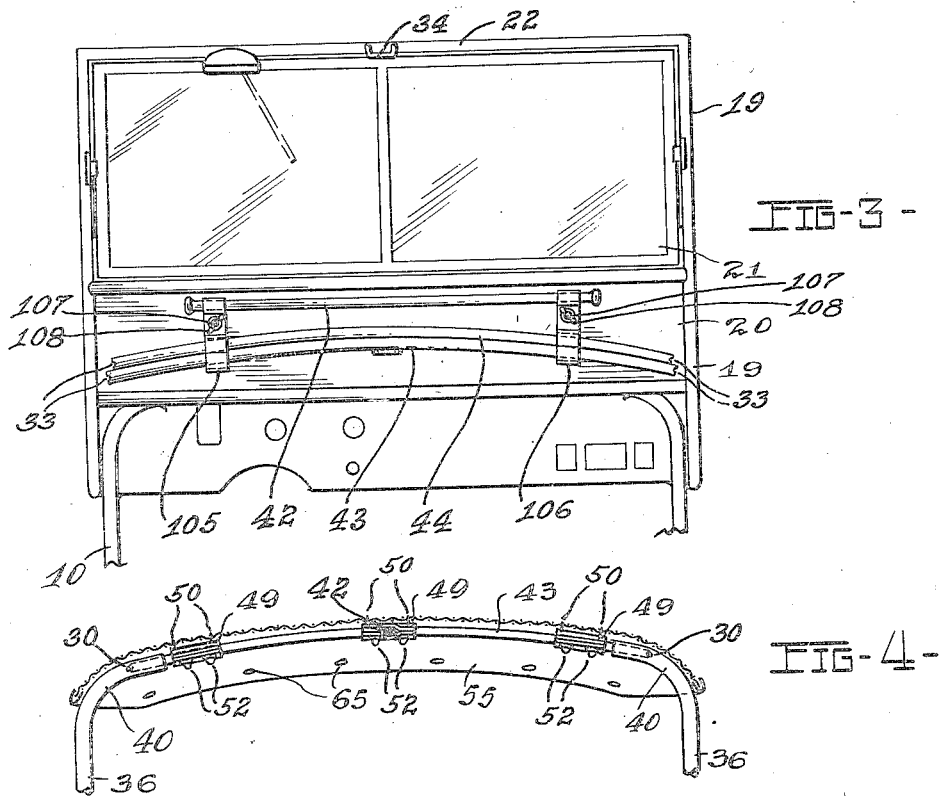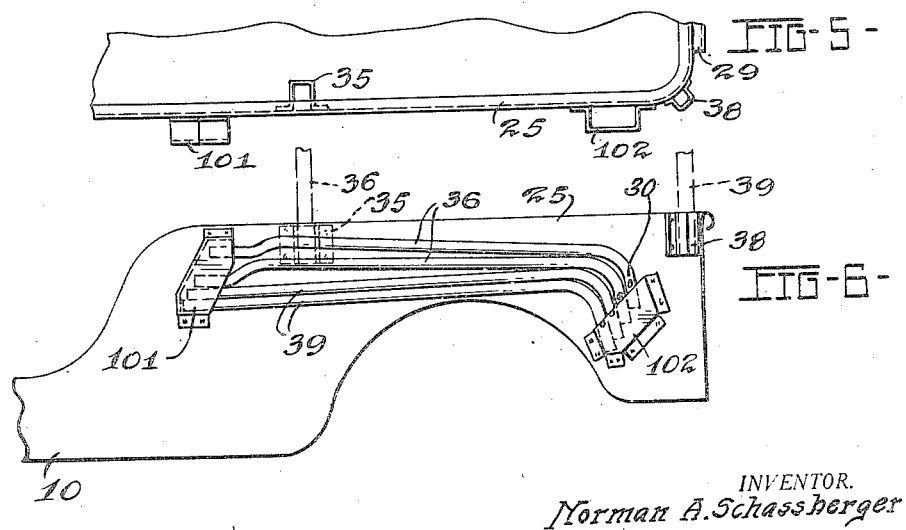

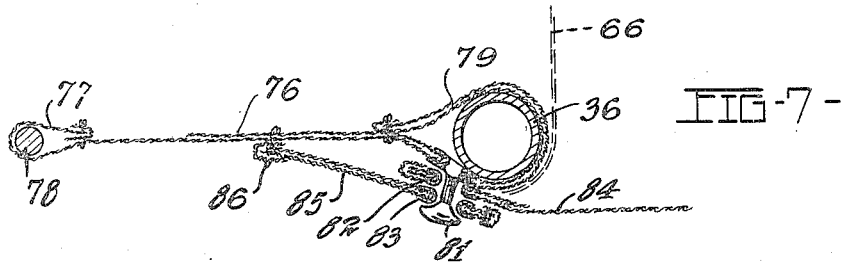
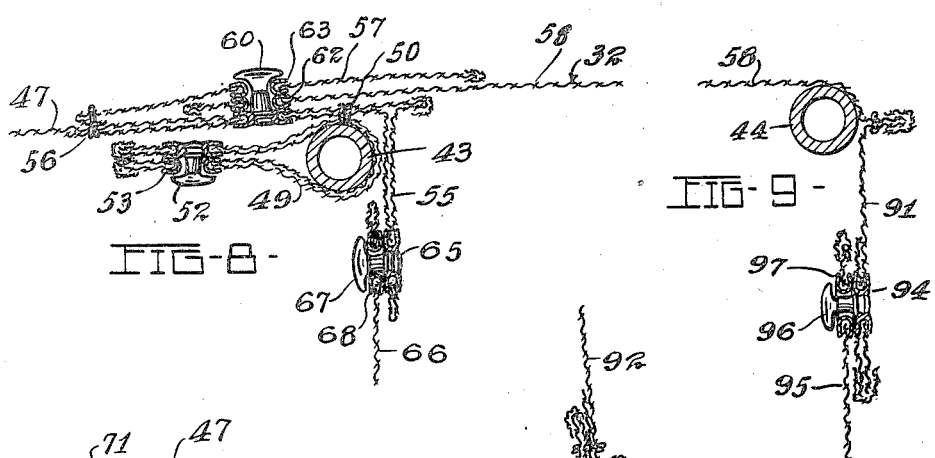
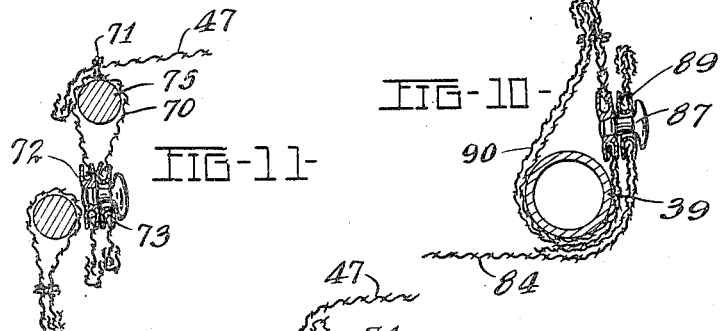
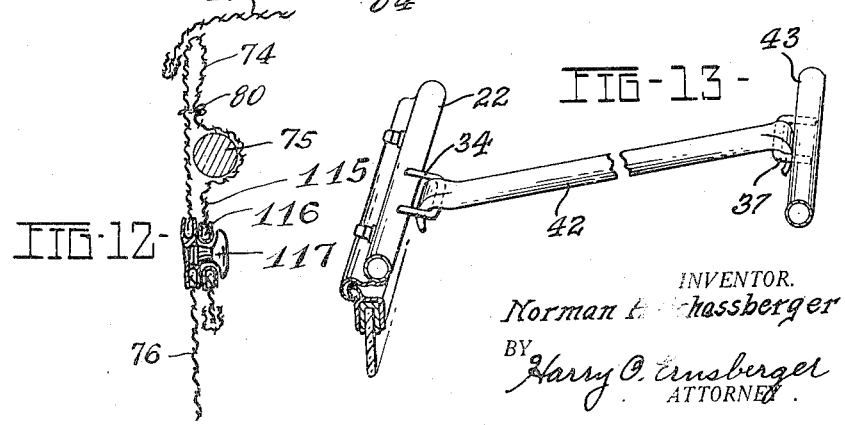

Patented Mar. 8, 1949

2,463,646

UNITED STATES PATENT OFFICE 2,463,646

VEHICLE TOP CONSTRUCTION

Norman A. Schassberger, Toledo, Ohio, assignor to Willys-Overland Motors, Inc., Toledo, Ohio, a corporation of Delaware Application July 13, 1945, Serial No. 604,782

4 Claims. (Cl. 296—104)

This invention relates to vehicle top construction and more especially to a top construction which may be readily applied or removed from a vehicle as desired.

The invention embraces the provision of a top and closure construction for a vehicle composed of several component elements which may be quickly and readily assembled upon the vehicle or removed therefrom without the use of tools.

The invention contemplates the provision of a top construction for a vehicle having a passenger compartment and a freight or package compartment wherein the top construction for the package compartment is independent of the top enclosure construction for the passenger compartment and is arranged to be applied or removed independently of the top and closure construction for the passenger compartment.

An object of the invention resides in the provision of a readily appliable top and closure construction for the passenger compartment of a vehicle to which may be secured and assembled a supplemental top and closure for an adjacent compartment, the supplemental top being adaptable for ready application or removal without disruption of the passenger compartment top and closure construction.

Another object of the invention resides in the provision of a removable top construction for one compartment of a vehicle which may be supplemented by a top and closure construction for an adjacent compartment of the vehicle, certain components of the supplemental top and closure construction being selectively removable or arranged to be stored in a position out-of-use as may be desired.

Still a further object of the invention resides in the provision of a compound top construction for vehicles in which the frame structure is formed of an assemblage of interengageable components which may be disassembled from top supporting position and stored upon the vehicle body in positions where they are readily accessible for reassembly of the top construction without the use of special tools.

Further objects and advantages are within the scope of this invention, such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred in which:

Figure 1 is a perspective view of a vehicle illustrating the compound top and closure construction of the invention as assembled thereon in a position-of-use;

Figure 2 is a view similar to Figure 1 showing the door construction for the passenger compartment removed from the vehicle and with the side and rear closures of the supplemental top in rolled or open position;

Figure 3 is a view of the windshield and instrument panel of the vehicle as viewed from the operator's compartment showing the means of storing certain components of the top frame construction when the top is disassembled from a position-of-use;

Figure 4 is a detailed sectional view taken rearwardly of the operator's compartment showing the method and means of securing the top deck for the operator's compartment to the bow frame construction;

Figure 5 is a top plan view showing a portion of the package compartment of the vehicle illustrating the supporting means for the top frame construction;

Figure 6 is a side elevational view of the portion of the body illustrated in Figure 5 showing components of the top frame construction in a stored or out-of-use position;

Figure 7 is a horizontal fragmentary sectional view taken substantially on the line 7—7 of Figure 1;

Figure 8 is a vertical sectional view about a longitudinal plane of the vehicle taken substantially on the line 8—8 of Figure 1;

Figure 9 is a fragmentary vertical sectional view taken substantially on the line 9—9 of Figure 1;

Figure 10 is a horizontal detail sectional view taken substantially on the line 10—10 of Figure 1;

Figure 11 is a detail sectional view taken substantially on the line 11—11 of Figure 1;

Figure 12 is a vertical transverse sectional view taken substantially on the line 12—12 of Figure 1;

Figure 13 is a fragmentary view illustrating means connecting frame bow and windshield construction.

While the top construction of the invention is illustrated in conjunction with a vehicle having an operator's compartment and a package or freight compartment, it is to be understood that it is contemplated that the invention may be utilized with any type of vehicle where the same may be found to have utility.

Referring to the drawings in detail, the vehicle with which the compound top construction of my invention is associated is inclusive of a body 10 formed with an operator's compartment 11 and a package or freight compartment 12 disposed at the rear of the operator's compartment. The body is supported by wheels 14 connected to the body through the medium of front and rear springs 15 and 16 respectively. The vehicle is provided with a windshield frame 19 having a metal panel portion 20 and a glazed shield portion 21. The package or freight compartment of the vehicle is formed by means of body side panels 25 and 26, rear quarter panels 27 and 28 and a tail gate 29, the latter being hingedly supported at the lower edge thereof and arranged to swing outwardly and downwardly to facilitate access to the package compartment.

The top construction of the invention is inclusive of two sections or components, a top construction 31 closing the operator's compartment and a second or supplemental top construction 32 enclosing the freight or package compartment. It should be here noted that the top construction 31 is assembled to the vehicle independently of the top construction 32 which may or may not be utilized as desired and is constructed to be assembled in conjunction with top construction 31 as hereinafter explained.

Arranged amidship of the body 10 is a pair of sockets 35 secured to the body side panels 25 and 26 respectively, the sockets being arranged to receive the lower extremities of struts or upright frame members 36 shown in broken lines in Figures 1 and 2. The rear corners of the body construction are provided with sockets 38 which are arranged to receive the lower extremities of upright members or struts 39. Both pairs of struts 36 and 39 are telescoped into the sockets so that they may be readily assembled or disassembled with the body construction. Each of the struts 36 and 39 are formed with curved upper portions 40 and 41 and are of tubular or hollow configuration adapted to telescope with the extremities of transversely extending frame bows 43 and 44 so as to provide in assembled relationship a pair of U-shaped frames or top supports as illustrated in Figures 1 and 2. Rivets 30 in struts 36 engage in notches 33 in the bows 43 and 44 to position the latter. The windshield frame 19 and forward bow 43 are respectively provided with clips 34 and 37 which are connected together by a rod 42 the ends of which are configurated into hook-like portions to engage in the clips 34 and 37. The windshield, frame struts 36, transverse bow 43 and rod 42 provide the means for supporting the top construction 31 for the operator's compartment. Struts 39 and transverse bow 44 support the rear portion of top construction 32, the forward portion being supported by bow 43 and struts 36 in conjunction with the top 31.

The top construction 31 disposed adjacent the passenger compartment of the vehicle comprises a deck or strip 47 of flexible material as for example, waterproofed canvas or the like, which is secured at its forward edge to transverse bar 22 of the windshield frame 19. The fastening means is of a character whereby the deck 47 may be quickly and easily removed. Any suitable conventional type of button fastener may be utilized for this purpose. Secured to the rear portion of the deck 47 is a plurality of fabric loops 49 which are stitched or otherwise secured to the decking 47 as at 50. As illustrated in Figure 4, there are three loops 49 employed to secure the decking 47 to the transverse bow 43. The parallel portions of each of the fabric loops 49 are provided with turnable fasteners 52 which is adapted to enter and cooperate with suitable grommets 53 for securing the parallel portions of loops 49 together when the loops are in embracing relation with the bow 43. The decking 47 adjacent the bow 43 is formed with a depending portion 55 which is folded back upon itself as shown in Figure 8 and extends forwardly of the decking and being stitched or seamed as at 56 to a lapping strip 57 which, with the rear portion of deck 47 is adapted to overlie the forward portion of the deck strip 58 of the supplemental top 32 as shown in Figure 8. A series of turnable button fasteners 60 are secured to the decking strip 47 as shown in Figure 8, the turnable portion of the fastener extending through suitable grommets 62 and 63 as illustrated in Figure 8 whereby the supplemental decking strip 58 is fixedly yet removably secured to a decking strip 47 of the top construction and the lapping strip 57.

The depending portion 55 is provided with a series of turnable fasteners 65 which are adapted to secure and support a fabric panel 66 which depends from strip 55 to form a rear closure for the operator's or passenger compartment. The turnable portions 67 of fasteners 65 extend through grommets 68 formed in the upper edge portion of the fabric panel 66. By this means of support, the depending panel 66 is rendered readily removable or the same may be applied by simple manipulation of the fasteners 67.

The side edge portions of the top deck strip 47 are reinforced by means of elongated fabric loops 70 which are stitched to the deck strip 47 as at 71. The parallel portions of the fabric loops 70 as illustrated in Figure 11 are removably secured together by means of fasteners 72, the tenon portion of which extends through grommets 73 carried by one of the depending portions of the loops 70. By this means the fabric loops 70 embrace or surround bars 75 disposed at each side of the forward compartment of the vehicle, each bar being respectively connected to the windshield frame 19 and an upright strut 36 by bolts or other suitable means (not shown) of a character which permit the ready removal or reassembly of the bars 75.

As shown in Figures 2 and 7 there is provided at each side of the vehicle a vertical fabric panel 76, the front edge of which is formed in a loop 77 embracing a vertically disposed supplemental strut 78 while the rear portion of panel 76 is formed with a loop 79 adapted to embrace or surround the vertical strut 36. Each of the bars 78 is secured to a side panel 25 of the body 10, the upper extremity of the bar being connected by suitable means (not shown) to the longitudinally extending bars 75 arranged adjacent each side of the vehicle.

When the transverse fabric panel 66 is used to complete the enclosure for the operator's or passenger compartment, its position is indicated in Figure 2, and by broken lines in Figure 7. When so assembled the vertical edge portions of panel 66 are provided with suitable grommets through which the fasteners 81 extend, the fasteners also projecting through grommets 83 in the strip 85 to secure the vertical lateral edges of the panel 66 in proper assembled relationship with respect to the upright struts 36.

The operator's or passenger compartment 11 may be completely enclosed through the use of removable door construction 100 as shown in Figure 1 which cooperates with the top decking strip 47 and side panels 76 to enclose the forward door compartment of the vehicle. As the door construction forms the subject matter of my copending application, Ser. No. 587,771, now Patent No. 2,460,399, issued February 1, 1949, and as it does not per se form a vital part of the instant invention, it will not be herein described in further detail.

The supplemental top 32 being inclusive of a decking strip 58 is arranged to overtake the transverse bow 44 and extends downwardly in a central depending portion 91 and rear spaced panels 92 and 93. A plurality of spaced fasteners 94 are carried by depending portion 91, the turnable portions 96 of fasteners 94 extending through suitable grommets 97 in a rear panel 95 so as to facilitate assembly and removal of the panel 95. A series of tie straps 98 are secured to side panels 92 and 93 and rear panel 95 whereby the panel may be further secured to the spaced rear panels 27 and 28 of the body construction and to the tail gate 29.

A portion of loop 79 supports a plurality of spaced fasteners 81 which are adapted to extend through the registering openings of a series of grommets 82 and 83 formed respectively in a roll type curtain or side panel 84 and a reinforcing or lapping strip 85 which is stitched or otherwise secured as at 86 to each of the vertical fabric panels 76. In assembled relationship, when curtains 84 are used, the forward edge portion of each side panel or curtain 84 extends between the loop 79 and the reinforcing or overlapping strip 85 whereby the turnable portion of fastener 81 extends through grommets 82 and 83 to secure the curtains or side panels 84 in depending or body closing position as shown in Figure 1. In Figure 2 the curtain 84 is shown in stored or rolled position and is held in such position by means of straps 88.

The side panel 25 of the body construction is provided with spaced members or brackets 101 and 102 which are adapted to enclose and secure the end portions of struts 36 and 39 when the latter are placed in a stored position, that is, when the top construction is in disassembled condition. In this connection, the metal panel portion 20 secured to the windshield frame 19 is provided with a pair of brackets 105 and 106 which are mounted upon bolts 107 and held in place by means of wing nuts 108. By rotating the wing nuts 108, the brackets 105 and 106 may be manipulated to accommodate and support the transverse bows or frame members 43, 44, and the connecting rod or link 42 in stored position when the top construction is disassembled. By this means the transverse bows 43 and 44 may be conveniently stored in an out-of-the-way position on the vehicle as shown in Figure 3.

The main top construction 31 for the passenger compartment and the supplemental top construction 32 for the freight compartment are assembled from a stored position to a position-of-use as follows:

The upright members of struts 36 and 39 when not in use are stored at the side of the body panel 25, being normally held in such position by means of brackets 101 and 102 as shown in Figure 6. The transverse bow frame members 43 and 44 are carried in a stored position adjacent the instrument panel by means of brackets 105 and 106 as shown in Figure 3.

In assembling the top construction 31 for the operator's or passenger compartment, the upright struts 36 are removed from the stored position as shown in Figure 6 and the lower offset ends thereof inserted in the sockets 35 mounted amidship of the vehicle body construction and upon each side panel 25 and 26. The vertical bars 78 are then assembled into position adjacent each side of the vehicle body. The fabric side panels 76 are assembled with each strut 36 and the adjacent bar 78 by slipping the looped portions 79 and 77 respectively over the strut 36 and bar 78 to the assembled position as shown in Figure 7. The bow frame bar 43 may be removed from stored position by manipulation of the winged nuts 108 to loosen the brackets 105 and 106. The frame bow 43 is then telescoped with the upper curved portions of upright struts 36 in a manner illustrated in Figure 4. The fabric deck 47 may then be assembled to the upper portion of the windshield frame 19 by means of fasteners of conventional type or other suitable securing means (not shown), the rear edge portion of the deck 47 passing over the bow 43. The fabric loops 49 are then wrapped around the bow 43, the fasteners 52 passing through the grommets 53 to secure the loops and hence the rear portion of deck 47 to the bar 43. The bars 75 which connect the windshield frame 19 with struts 36 are assembled in position the decking 47 overlying each of the bars as shown in Figure 11. The fabric strip 70 in the form of an elongated loop is wrapped around the bar 75 and secures the top decking 47 to the bars by means of fasteners 72 passing through grommets 73 in the parallel juxtaposed portions of the fabric strip 70. The upper portions of the side panels have a double thickness portion 74 formed by the stitching 80, the portion 74 extending upwardly beneath the side edges of decking 47 as shown in Figure 12. Portions 115 of side panels 76 are formed with grommets 116 through which fasteners 117 extend as shown in Figure 12, the portions 115 extending around the bars 75 to secure each side panel 76 to a bar 75 at each side of the vehicle. The door construction 100 is of a removable character as disclosed and described in my copending application hereinbefore referred to, and such door construction may be assembled to each side of the vehicle as shown in Figure 1.

If it is desired to completely enclose the operator's compartment, the panel 66 may be assembled into a position of use as shown in Figure 2. This assembly is accomplished by passing the fasteners 67 through grommets 68 carried by the fabric panel 66, and passing the fasteners 81 through suitable grommets formed in the vertical edge portions of panel 66, and through grommets in the lap strips 85 to secure the edge portions of panel 66 in close engagement to the upright struts 36. As shown in Figure 7, the panel 66 is removed when the supplemental top and side roll curtains 84 are used, but when panel 66 is utilized it occupies the position as shown in broken lines in Figure 7 with the fasteners 81 employed to hold the panel 66 in position. It will be noted from the foregoing explanation of assembly that the top construction 31 and enclosure is complete for the vehicle operator's or passenger compartment.

When it is desired to assemble the supplemental top construction 32 for the protection of the package or freight compartment of the vehicle, the upright struts 39 are removed from the position of storage illustrated in Figure 6, and each telescoped into its respective socket 38 disposed adjacent each rear corner of the vehicle body.

The supplemental top decking 58, is then removed into approximate assembled position with the loops 90 of the rear side panels 92 and 93 telescoped over the upright struts 39 as shown in Figure 10. The second frame bow 44 may be removed from stored position on the windshield construction and telescoped into the curved upper extremities of the struts 39 and beneath the supplemental decking 58 whereby the decking assumes the position adjacent the frame bow 44 as shown in Figure 9. The forward edge portion of the supplemental decking 58 of the top construction projects in overlapping relationship with the strip 57 and the rear portion of decking 47 as shown in Figure 8. The fasteners 60 extending through the grommets 62 and 63 hold the supplemental decking 58 in assembled relationship. It should be noted that the overlapping joint of deckings 47 and 58 and the strip 57 forms, in effect, a weatherproof joint for the reason that any water which may seep in beneath the strip 47 will flow forwardly to a point adjacent the stitching 56 and as the top construction is slightly convex in a transverse direction any water adjacent seam 56 will flow laterally to the exterior of the closure. The roll curtains or side closures 84 may be arranged in a position of use as shown in Figures 1, 7 and 10 wherein the fasteners 81 secure the forward edge portions of curtains 84 in position as shown in Figure 7, and wherein the fasteners 87 carried by panels 92 and 93 extend through grommets 89 in the rear edge portions of curtains 84 to hold the same in assembled relationship adjacent the upright struts 39 as shown in Figure 10. By effecting a release of fasteners 81 and 87 each side curtain 84 may be rolled up into a position out-of-use as shown in Figure 2.

It will therefore be obvious from the foregoing description that the supplemental top 32 may be quickly assembled to a position-of-use, or disassembled to a position out-of-use without affecting the assembly of the top construction 31 and enclosure for the operator's compartment.

It is apparent that, within the scope of the invention, modifications and different arrangements may be made other than is herein disclosed, and the present disclosure is illustrative merely, the invention comprehending all variations thereof.

What I claim is:

1. In combination with a vehicle body having a windshield frame and an operator's compartment; a top supporting frame including a pair of vertically disposed struts removably mounted upon the body rearwardly of said windshield frame; a transverse bow connecting said struts; a flexible top covering extending between the windshield frame and the transverse bow; a plurality of fasteners carried by the windshield frame and engageable in openings in the top covering for removably securing the latter to said windshield frame; a plurality of transversely spaced loops of flexible material secured to said top covering and disposed adjacent said bow; said loops adapted to surround said bow, and fastening means associated with said loops for removably securing the latter to the bow.

2. In combination with a vehicle body having a windshield frame and an operator's compartment; a top supporting frame including a pair of vertically disposed struts removably mounted upon the body rearwardly of said windshield frame; a transverse bow in telescopic connection with said struts; a flexible top covering extending between the windshield frame and the transverse bow; a plurality of fasteners carried by the windshield frame and engageable in openings in the top covering for removably securing the latter to said windshield frame; a plurality of transversely spaced loops of flexible material secured to the top covering and disposed adjacent said bow; said loops adapted to surround said bow; fastening means associated with said loops for removably securing the latter to the bow; a top rail disposed at each side of said top covering and removably secured to said windshield frame; means for removably securing the lateral edge portions of said top covering to said top rail; a second pair of struts connecting said top rails with the body; and side panels of flexible material connected to said top rails and both of said pairs of struts.

3. In combination with a vehicle body having a windshield frame, an operator's compartment and a rear compartment; a demountable top construction including a top supporting means; said means including a pair of vertically disposed struts removably mounted upon the body rearwardly of said windshield frame; a transverse bow telescopically connected with said struts; a flexible top covering extending between and removably secured to the windshield frame and the transverse bow; a plurality of transversely spaced loops of flexible material secured to said top covering and disposed adjacent said bow; said loops being adapted to surround said bow; fastening means associated with said loops for removably securing the latter to said bow; side strips of flexible material disposed adjacent said struts and removably secured thereto, and a supplemental top frame including a second pair of struts removably secured to the body rearwardly of said first mentioned struts; a transverse bow telescopically connected with said second pair of struts; a flexible top covering supported by said second mentioned bow and removably connected to said first mentioned top covering; said second mentioned covering having depending rear portions disposed adjacent said second mentioned struts and removably secured thereto; a rear wall panel arranged to be removably connected to the depending portions of said second mentioned top covering; and a removable flexible wall adapted to be connected to said first mentioned top covering and the side strips for separating said operator's and rear compartments.

4. In combination with a vehicle body having a windshield frame; a pair of spaced top supporting frames mounted upon said body rearwardly of said windshield frame; each of said top supporting frames including an upper transverse member; a top covering of flexible material removably connected to said windshield frame and extending to one of said top supporting frames; a plurality of transversely spaced loops of flexible material secured to said top covering and disposed adjacent the upper transverse member of said one top supporting frame; said loops adapted to surround said upper transverse member; fastening means associated with said loops for removably securing the latter to said upper transverse member, a lapping strip secured to said top covering; a second top covering having a portion extending between the first mentioned top covering and the lapping strip; fastening means for connecting said second mentioned top covering to said first mentioned top covering and said lapping strip; said second mentioned top covering overlying the upper member of the rearmost top supporting frame.

NORMAN A. SCHASSBERGER.

REFERENCES CITED

The following references are of record in the file of this patent:

UNITED STATES PATENTS

| Number | Name | Date |
|---|---|---|
| 304,015 | Mahan | Aug. 26, 1884 |
| 859,815 | Kelley | July 9, 1907 |
| 981,771 | Kretz | Jan. 17, 1911 |
| 988,204 | Mitchell | Mar. 28, 1911 |
| 1,109,475 | Sipperley | Sept. 1, 1914 |
| 1,173,116 | McGrail | Feb. 22, 1916 |
| 1,438,195 | Thomas | Dec. 12, 1922 |
| 1,439,142 | Buob | Dec. 19, 1922 |
| 1,679,642 | Walden | Aug. 7, 1928 |